United States Patent
Cuthbert et al.

(10) Patent No.: US 8,300,646 B2
(45) Date of Patent: Oct. 30, 2012

(54) MESSAGE HANDLING IN A LOCAL AREA NETWORK HAVING REDUNDANT PATHS

(75) Inventors: Richard Cuthbert, Thornhill (CA); Matthew George Eglin, Ottawa (CA); Dean Goodwin, Kanata (CA); Jeff Joslin, Ottawa (CA)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 539 days.

(21) Appl. No.: 11/520,460

(22) Filed: Sep. 13, 2006

(65) Prior Publication Data

US 2007/0211730 A1 Sep. 13, 2007

(30) Foreign Application Priority Data

Sep. 13, 2005 (EP) .................................... 05019886

(51) Int. Cl.
*H04L 12/28* (2006.01)
*G06F 15/16* (2006.01)

(52) U.S. Cl. .................. 370/395.53; 709/228

(58) Field of Classification Search ............. 370/395.53
See application file for complete search history.

(56) References Cited

U.S. PATENT DOCUMENTS

| | | | |
|---|---|---|---|
| 5,983,360 A | 11/1999 | Ugajin | |
| 6,330,229 B1 | 12/2001 | Jain et al. | |
| 7,246,168 B1 * | 7/2007 | Bales | 709/228 |
| 2003/0048746 A1 * | 3/2003 | Guess et al. | 370/219 |
| 2004/0001487 A1 * | 1/2004 | Tucker et al. | 370/389 |
| 2005/0153698 A1 * | 7/2005 | Sahim et al. | 455/444 |
| 2005/0185614 A1 * | 8/2005 | Ikeda | 370/329 |
| 2005/0259597 A1 * | 11/2005 | Benedetto et al. | 370/254 |
| 2006/0133365 A1 * | 6/2006 | Manjunatha et al. | 370/389 |
| 2006/0221930 A1 * | 10/2006 | Sweeney et al. | 370/351 |
| 2007/0025275 A1 * | 2/2007 | Tallet et al. | 370/255 |
| 2007/0036291 A1 * | 2/2007 | Graham | 379/88.13 |

FOREIGN PATENT DOCUMENTS

| | | | |
|---|---|---|---|
| JP | 2002368777 A | | 12/2002 |
| WO | WO 2004/010653 A1 | | 1/2004 |

* cited by examiner

*Primary Examiner* — John Blanton

(57) ABSTRACT

Message handling in a local area network including switches and clients is provided. At least one of the switches is a peer switch that is capable of monitoring a status of another switch, and at least one switch connects the clients redundantly. A station announcement message is sent by the peer switch for at least one client of the other switch. In each station message announcement, there is inserted a source address of the other switch. The other switches handle the station message announcement as though the station message announcement came from the client.

15 Claims, 3 Drawing Sheets

MESSAGE HANDLING IN A LOCAL AREA NETWORK HAVING REDUNDANT PATHS

CROSS REFERENCE TO RELATED APPLICATIONS

This application claims priority of European application No. 05019886.0 EP filed Sep. 13, 2005, which is incorporated by reference herein in its entirety.

FIELD OF INVENTION

The present invention relates to providing load balancing and fail over redundancy for a local area network (LAN) and, in particular, a virtual local area network (VLAN).

BACKGROUND OF THE INVENTION

As well known in the art, a LAN is a group of computers and associated devices that share a common communications line or wireless link and typically share the resources of a single processor or server within a small geographic area, for example, within an office building. Usually, the server has applications and data storage that are shared in common by multiple computer users. The major local area network technologies include Ethernet, Token Ring and FDDI (Fiber Distributed Data Interface). Another LAN technology, ARCNET, once the most commonly installed LAN technology, is still used in the industrial automation industry.

LAN's have particular applicability to telecommunications applications. A suite of application programs, or services, may be maintained on the LAN server and distributed or broadcasted to remote telephone subscribers. Users who request an application may download it once and then execute it from their local storage device. In telecommunications, a client may decide to subscribe to a call forwarding service which is sent to the user through the LAN connection and stored locally in the user's next generation telephone.

A VLAN is a group of end-stations typically on multiple physical LAN segments that can communicate as if they are on a common LAN segment. This is done by grouping paths sharing the common LAN segments according to each VLAN. Typically, VLANs are implemented using tags in message headers in order to delineate the VLANs.

Layer 2 Ethernet bridges and switches "learn" where their clients are located in a network. Each time a bridge receives a frame it looks for the source address of the frame in its forwarding table, which is a table maintained by the switch that shows the switch where to forward a frame sent to a particular destination. A switch's forwarding table can be treated as a list of the addresses of its current clients plus information about how to forward frames destined for those clients.

If the source address is not listed in the forwarding table the switch adds an entry to the table for it. The entry identifies the switch port on which the frame from the source address was received. A VLAN-aware switch also records the VLAN on which the frame was received. A switch that supports VLAN tags. A VLAN-aware switch is a switch that makes frame forwarding decisions based on VLAN tags in frame headers and adds and removes tags as required.

If an entry for the address already exists in the forwarding table, but is associated with a different port or port VLAN than the incoming message, the switch will update its forwarding table to reflect the port, or port VLAN, on which it received the frame. This learning process is a standard feature of Ethernet switches and bridges.

In any Ethernet network there must be exactly one active path between any pair of communicating stations. A station is a device that originates and receives messages on a network. If multiple paths exist between two stations then a loop will exist in the network that could lead to outages caused by broadcast storms. This is a problem which will be better appreciated with reference to FIG. 1.

In FIG. 1, there is shown a LAN 100 with end stations 101, 102, 103 and 104, which may be end terminals, computers, telephone end-device or any terminal for that matter. Switches 105, 106, 107 and 108 connect the various end stations. In FIG. 1, there are redundant paths 109 and 110 between End Station 1, 2 or 3 and end station 4 respectively. The problem with redundant paths is that the same message is sent redundantly over different paths to the end station. In large networks, this can quite easily become problematic and can overwhelm a network in a relatively short time.

Switches and bridges typically deal with redundant links by shutting down all but one of the links in the redundant set. Protocols such as the known Spanning Tree Protocol (STP) are employed to detect redundant paths through the network and to select redundant links to shutdown. Spanning Tree Protocols make all the switches responsible for identifying redundant paths in a network.

SUMMARY OF THE INVENTION

In FIG. 1, for example, Switches X and Y 105, 106, are responsible for detecting that switches A and B provide redundant paths between them and to eliminate sufficient redundant links. This is the industry standard approach to managing redundant links in an Ethernet network. However, the previous methodology has several disadvantages. In particular, in large networks involving many switches, adjusting the network to accommodate the myriad of overloaded or failed switches and links can take an unacceptably long period of time.

What is needed is a better apparatus and method for providing for overload and fail over situations in networks, particularly LANs and VLANs. A solution that requires relatively little system resources and resolves the problem of redundancy in an efficient manner in an acceptable time.

The present invention utilizes peer switches. Peer switches occupy the same logical location in a network. In other words, all peers are connected to the same network routers, switches and end stations. Peer switches provide redundant paths through a network. In FIG. 1, Switch A and Switch B could be peers. Switch X and Switch Y are not peers since they are connected to very different sets of stations. Peer switches are able to monitor each others' "health", or status, and exchange detailed state information, such as the contents of each switch's forwarding table. A peer switch group is referred to here as a single collection of peer switches. All of the members of the collection are peers of all other members of the collection.

The invention provides a method and apparatus for message handling in a virtual local area network including switches and clients, wherein at least two of the switches are first and second peer switches, and at least the second peer switch connects the clients redundantly. A station message announcement is sent by the first peer switch for at least one client of the second peer switch. In each station message announcement, a source address of the second peer switch is inserted. A switch outside the peer group treats the station message announcement as though the station message announcement came from the device whose address is in the source address field of the header of the station message announcement.

The invention has several advantages. For one thing, the above methodology employ a form of address spoofing by inserting the MAC address into the station announcement message. This facilitates dynamic network reorganization without requiring special software or unusual capabilities on a switch or bridge. Instead, the invention takes advantage of the nature of VLAN switches to automatically "learn" network architecture.

In addition, the invention is simplified by broadcasting station announcements on behalf of many stations from a switch in a peer group to switches outside the peer group to implement failover. In this manner, the invention does not overburden the network with re-assigning the VLANs individually. Similarly, this arrangement is also advantageous to implement load redistribution as part of an overall load balancing strategy.

It shall be appreciated that the use of station announcement allow members of a switch peer group to manage redundancy in situations in which other mechanisms for managing network redundancy, such as Spanning Tree Protocols cannot be used. Using station announcements to provide a means for a group of peer switches to manage their workload and redundancy autonomously advantageously does not require the assistance from special functions implemented on the switches, bridges and routers to which they are attached.

BRIEF DESCRIPTION OF THE DRAWINGS

The present invention shall be described with reference to the following figures in which at least one example of the invention is illustrated.

DETAILED DESCRIPTION

Figure 1:
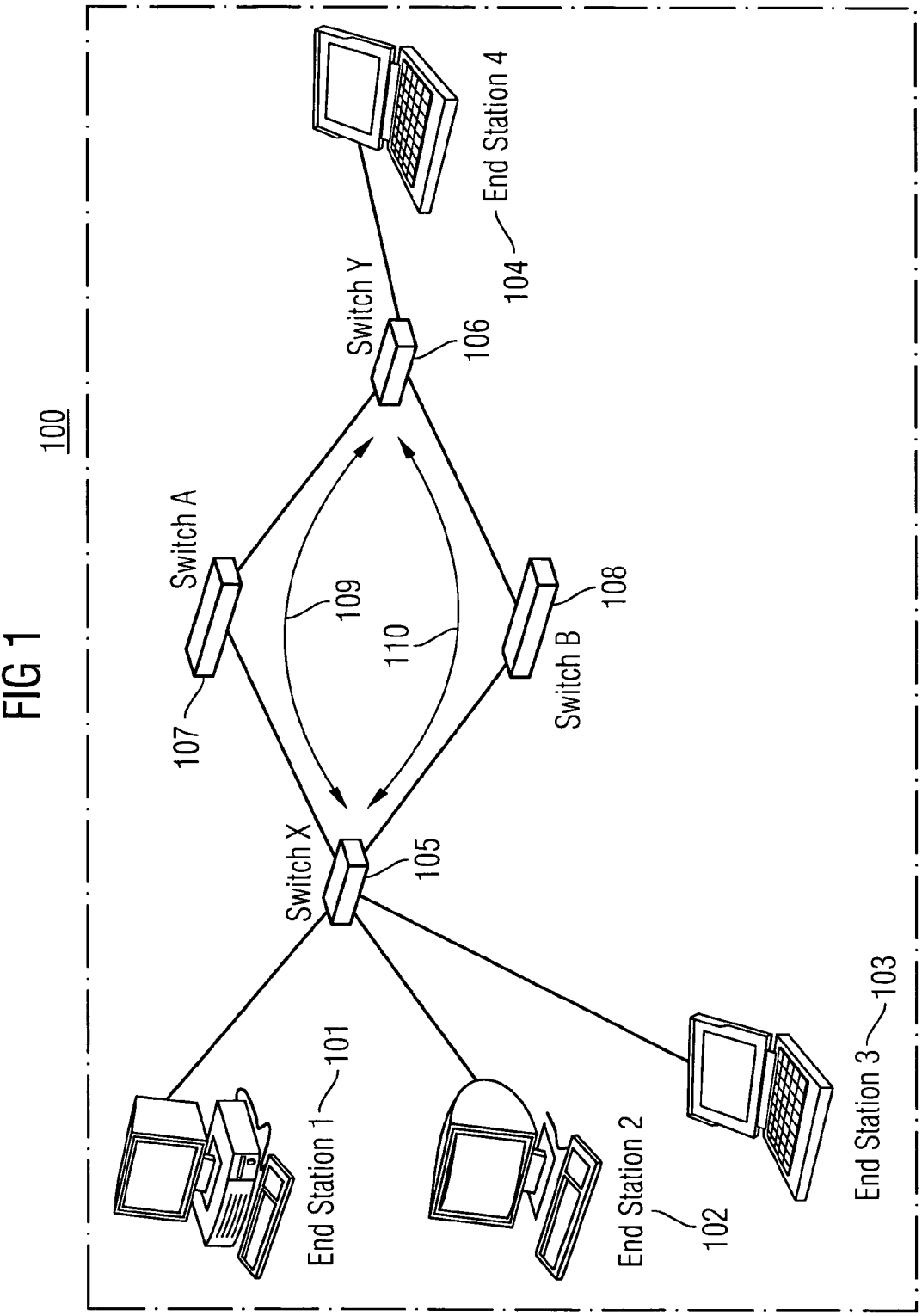
FIG. 1 illustrates a state of the art LAN.

The inventive solution shall now be described with reference to FIG. 2. Similar to FIG. 1, the LAN shown in FIG. 2 includes end stations 201-205, which may be any of the afore-described terminal devices. Switches X and Y 206, 207 connect the end stations 201-205. Peer switches 208, 209, such as switch A and switch B communicate with each other and share state information.

In exemplary figure shown, the peer switches (A and B 208, 209, in the example) monitor each others' health. If one of them fails, the other may take over. The rest of the network need not be aware of the number of switches in the peer group or which of the links into and out of the peer switch group are redundant because the members of the switch group manage the redundancy in a fashion that is more or less transparent to the rest of the network. The question is, if switch B fails how does switch A take over for it.

Many mechanisms for detecting the state of another peer may be used. For example, the detecting mechanism may be to send a layer 2 multicast or broadcast message to all other switches on a predictable, periodic basis. Failure to receive a certain number of these messages within a certain time window, for example, indicates that the switch that should have originated the broadcast effectively is out of service. In addition, the mechanism for detecting that load balancing or failover is required should be decoupled from the mechanism that implements/causes the failover. Another alternative is to directly connect the switches together into a "private network" and perform health monitoring, namely periodic message exchanges, over this private network. It shall be appreciated that the manner in which the peers detect fail over or redundancy will not be focused on here.

In any event, since stations A and B can communicate, each maintains a copy of the other switch's forwarding table. Each member of the peer group then knows the list of all clients currently being served by the peer group. The address of each of the peer group's clients is maintained in this "shared" forwarding table.

To continue, the message may contain useful information, such as lists of the clients that have started receiving service from the switch sending the message since the last time the switch sent the message. To ensure that the payload ports of each switch are operational, the broadcasts are sent using the payload interfaces.

If switch B should fail, switch A will eventually detect the failure. When switch A detects the failure it creates one station announcement message for each client using switch B and broadcasts that frame to the part of the network outside the peer group. For example, suppose switch B carried traffic for all the end stations in FIG. 2. Then for each of the four end stations Switch A would create a station announcement frame and broadcast it out each of its ports, other than the port through which the station actually will send frames.

A station announcement may be, in one aspect of the invention, a layer 2 message that appears to originate at an end station, recalling that a source address of the message is the address of an end station. At a minimum, the message need only a message header containing the apparent address of the source. The destination address may be a non-specific broadcast address. In an 802.3 (Ethernet) network the frame should contain enough padding to ensure that the entire frame has the length required by the protocol.

In following with conventional switching practice, a switch should not forward a frame back out the port (or port-VLAN) on which it received the frame. For example, in FIG. 2, if end station 204 sends a broadcast message, Switch Y 206 must broadcast it on all its ports except the one it received it on. This prevents frames from "ping-ponging" back and forth between a set of switches and stations. In addition, this prevents switches from becoming confused about which switch port a device is using.

The same rule is typically applied to members of a switch peer group. If switch B 209 receives a frame from end station 1, it does not send it back to switch X, from which it received the frame in the first place. Now, in the case that Switch B 209 fails, switch A 208 respects the same rule. During a fail over, switch A 208 broadcasts station announcements for the stations whose traffic it will now switch. Switch A 208 takes care where it sends the station announcement for a station or it could cause the "ping-ponging" or switch confusion that must be avoided.

Figure 2:
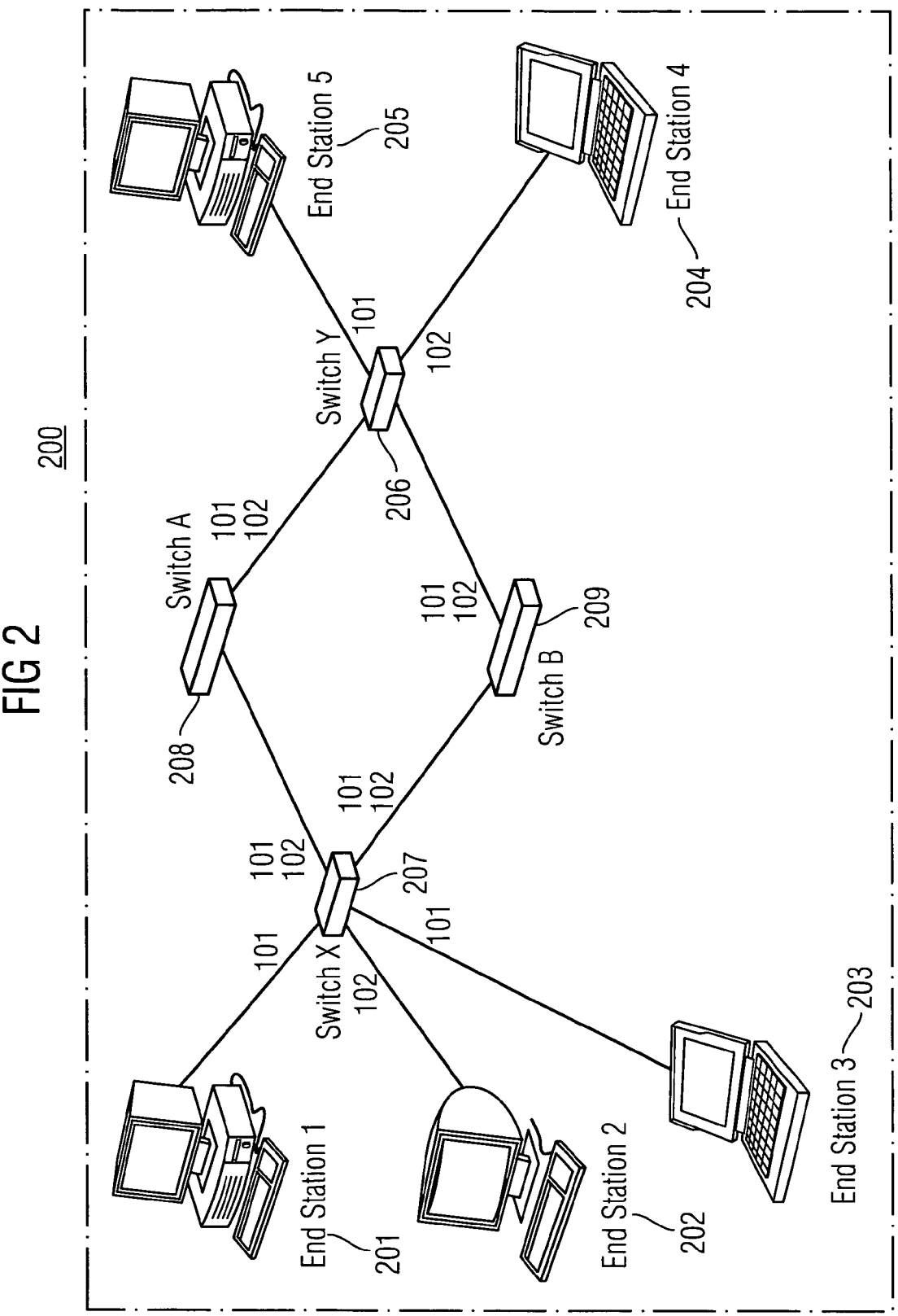
FIG. 2 illustrates the LAN of the present invention.

In the example of FIG. 2, there is shown 4 end stations. This assumes that switch B switches the traffic for all end stations. In this case, if Switch B fails, Switch A makes 4 separate station announcement broadcasts. Each broadcast is sent on behalf of one of the 4 end stations in the example. It is important that the station announcements sent by Switch A on behalf of end stations 1, 2, and 3 not be sent to Switch X as that would cause Switch X to believe the end stations had moved. Similarly it is important that the station announcement send by Switch A on behalf of end station 4 not be sent to Switch Y as that would convince switch Y that end station 4 had moved, which it has not. Therefore, in the example the station announcements broadcast on behalf of end stations 1,2, and 3 toward switch Y but not Switch X and the broadcast on behalf of end station 4 is sent to switch X but not switch Y.

The switch that takes over from the failed peer switch fills in the message headers of the station announcements and sends them. That switch maintains a list of all the stations being serviced by the peer that failed.

Assuming the switch that takes over (Switch A in the example) has such a list (e.g. a shared forwarding table), then it will have the addresses of the devices that were clients of the failed switch. The switch that takes over iterates over this list, building one broadcast station announcement per device and sending it to the network following the rules described in point 2 above.

In this example switch A has only two connected ports. When it sees that switch B failed it will broadcast a station announcement for end station 1 out every one of its ports other than the one through which station 1 communicates. In this example there is only one such port, which connects to switch Y. It will also broadcast a station announcement for end station 2 toward switch Y. Further, switch A broadcasts a station announcement for end station 3 toward switch Y. Lastly, switch A broadcasts a station announcement for end station 4 toward switch X. When switches X and Y receive the station announcements they will broadcast them out all their ports other than the ones on which they received them.

An advantageous feature of the station announcements sent by the switch is that each frame appears to originate from one of the clients of the switch that failed. In Ethernet terms, the source MAC (address of the originator) in the frame header is one of the MAC addresses stored in the "shared" forwarding table, not the address of the switch sending the frame. In this sense, the switch sending the station announcement is "spoofing" the MAC addresses of other stations.

This is significant because, when switches outside the peer group receive the message, they will process it as if it actually came from the station whose address is spoofed, i.e., the client of the switch that failed. The switches receiving the station announcements will learn that a new path to the apparent source of the frame should replace any path they already know. Thus, the bridges/switches outside the peer group do not need any special code to deal with the failure of one of the switches in the group. This use of station announcements exploits the standard learning behavior of layer 2 Ethernet switches and bridges.

It is important to note that station announcements are not necessarily sent between members of the peer switch group. Their main function is to inform other switches and bridges outside the peer switch group of the new forwarding path to a station. It is also important to note that the station announcement is not a special message sent from one switch to another to say it is taking over from a third switch. It is just another standard layer 2 message.

As already explained, every switch maintains a forwarding table. The format of the table is proprietary and varies depending on whether or not the switch supports VLANs. At a minimum, the table contains a list of pairs. One member of the pair is the hardware address of a station and the other member is the port (or port-vlan) out which the switch should forward a frame destined for the station. When a switch receives a unicast frame, it looks up the frame's destination address in its forwarding table to tell which port (or port-vlan) to forward the frame onto.

In general, switches populate and update the forwarding table through a learning process. Whenever a switch receives a frame it looks at the source address of the frame, which is a field in the header that contains the hardware address of the device that sent this frame. If the source address is not in the forwarding table the switch makes an entry in the forwarding which indicates the port (or port-vlan) on which it received the message from the device with the address in the entry. If an entry already exists for the address and the port listed in the forwarding table, such as when the device is different from the one on which the message was received, then the switch updates its forwarding table to associate the MAC address with the new port.

It is this second updating behavior that station announcements exploit. All switches incorporate both types of learning, i.e., adding new entries to the forwarding table for new addresses and changing the ports associated with existing entries when a message from a device listed in the table is received on a different port than previous messages from the device.

Thus far, fail over has been discussed. However, the present invention may be applied to load balancing. Returning to FIG. 1, for the moment, it shall be appreciated that the figure illustrates a single LAN containing one peer group comprised of switches A and B. In that type of network, all traffic between switches X and Y flow through exactly one of switch A or switch B. Load balancing is not possible in that scenario. Station announcements can only be used for triggering failover when one of the switches in the peer group fails.

Typically, VLANs are used to partition traffic in a single physical network into several distinct logical/virtual networks that happen to share the same physical infrastructure. Combining VLANs with peer switch groups creates the possibility of load balancing between members of the peer group. FIG. 2 contains an example of combining peer switch groups with VLANs. The figure contains two virtual networks overlaid on one physical network. A VLAN 101, for example, consists of end stations 1, 3, and 5 as well as ports on switches X, A, B and Y. A VLAN 102, for example, consists of end stations 2 and 4 as well as ports on switches X, A, B and Y.

In the example, both VLANs have redundant paths between switch X and switch Y. Conventional networks would use spanning tree or static configuration to disable (until needed) the unnecessary duplicate paths. The availability of station announcements in the present invention creates another possibility though. Assuming that switches A and B are peers and can communicate with each other they can decide for themselves which VLANs each will carry. Switches X and Y may be configured as shown in FIG. 2 to put VLANs 101 and 102 on the links to both switches in the peer group.

This feature can be used for load balancing between switches at the granularity of a VLAN. The switches in a peer switch group can monitor each other's workload as well as state and forwarding table information. If a member of a switch peer group becomes overloaded one of its peers can take responsibility for some of its VLANs. How overload is defined and detected is out of scope as is the mechanism for identifying which VLANs should be moved from an overloaded switch to a more lightly loaded switch.

The peer that accepts load from an overloaded switch must take over responsibility for entire VLANs. In order to takeover responsibility for one VLAN, a switch sends station announcements on behalf of all the stations listed in the shared forwarding table as using the VLAN to be moved. The process of transferring a VLAN from one switch to another proceeds much as it did in the failover cases described earlier, except that in this case the overloaded switch as well as the peer taking over some of the VLANs both remain in service and both continue to switch frames.

Now, a practical application of the invention will be described with respect to an actual switching network 300 shown in FIG. 3. As shown, the network is partitioned into logical networks including a Core Network 302 and an access network 304 that hosts a VLAN or set of VLANs 306 that service end stations 308. The first logical network is the core network that hosts an organization's servers and gateways and provides services to client stations on the network. The second logical structure is an Access network that hosts end stations, including mobile stations who want to attain access to the Core network's services. Such a logically divided network may be, for example, a Siemens HiPath Wireless Server (HWS)™.

Intermediating the core and access networks is a core network switch 310. There may be VLAN-aware switches 312 coupled to the core network switch 310. Wireless LAN access points 314 are illustrated and may also be used. The network provides several services based on its ability to map between Core and Access Network VLANs. On the core network side 302, there may include a router 316 that couples the core network switch 310 to the internet 318 and/or server 320 that handles video streaming and the like.

Also included may be a BSS (Basic Service Set) 322, which is shown in the Figure as a the set of stations. In this case, the BSS 322 includes one Access Point (AP) that operate as a fully connected network. The AP is connected to a wired network. The Figure exemplifies how the BSS 322 are grouped into ESS, a set of BSS that share a common layer 2 network through a switch or hub. Thus, the HWS provides mobility between ESS, fulfilling its function.

Figure 3:
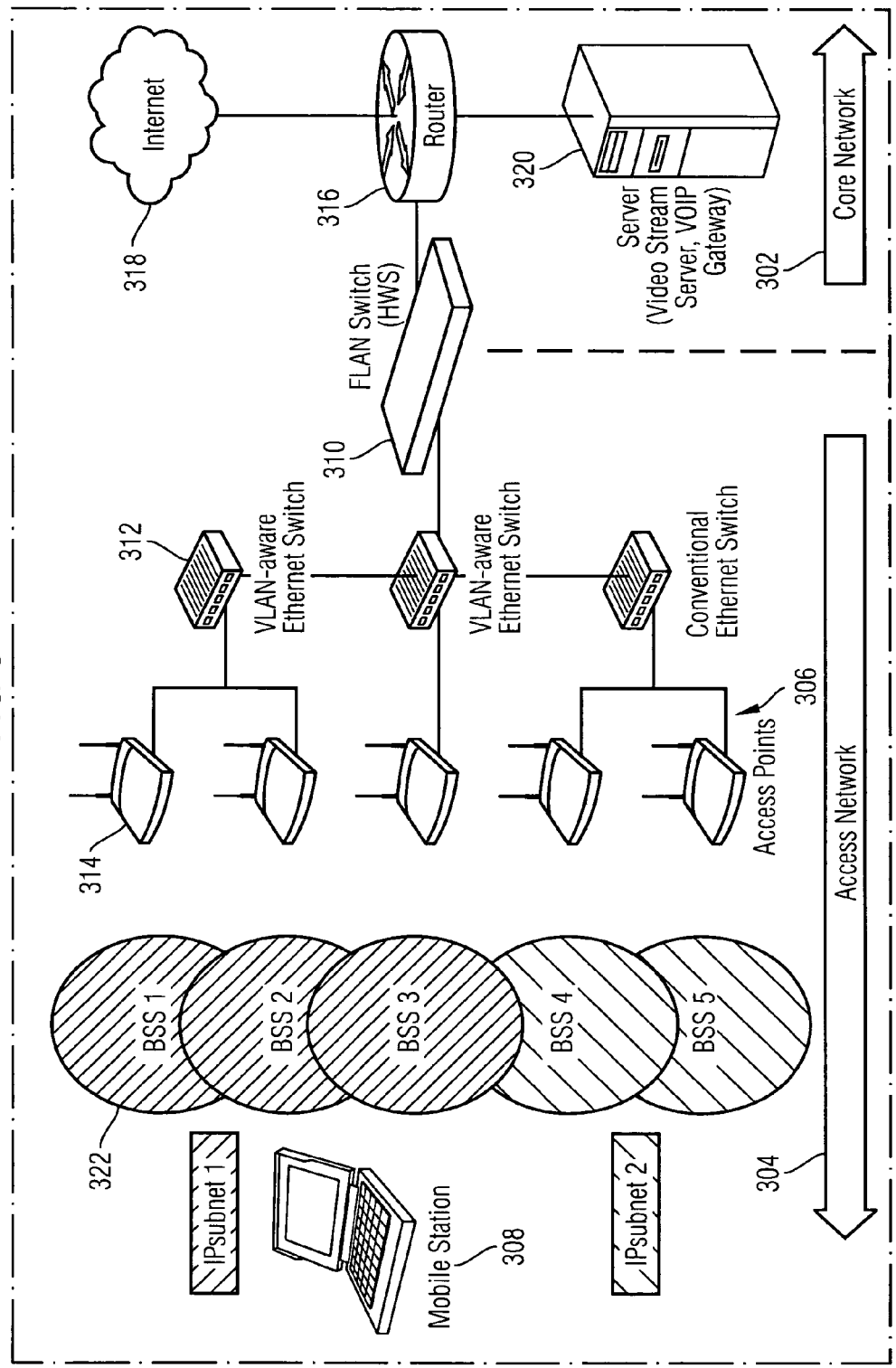
FIG. 3 illustrates a variant of the present invention.

The example of FIG. 3, thus, illustrates a robust peer switch group of switches. The core switches in such a switch peer group decide amongst themselves how load is to be distributed and whether the group will operate in failover or load balancing modes. The core switches in a peer group can use the invention to implement failover and load balancing at the granularity of VLANs.

In the case that the core switch in a peer group implements load balancing, then each core switch in the group takes responsibility for some portion of the Access Network VLANs. On the other hand, the core switch in a group do not own Core VLANs. Any core switch can switch a frame onto any Core VLAN at any time, so long as its proprietary forwarding table indicates that the Core VLAN is the correct destination for the frame.

In a core switch peer group, load balancing and failover are performed with respect to the access network VLANs. In order to transfer responsibility for a VLAN from one core switch to another the receiving core switch, for each station communicating on an Access Network VLAN, broadcasts a station announcement to the Core VLAN with which that station is associated. For each Core Network station known, the core switch broadcasts a station announcement to the Access Network being taken over. In a failover scenario, the surviving core switch performs these steps for each Access VLAN owned by the failed HWS. In a load balancing scenario, the core switch performs these steps for each VLAN that it takes over from the overloaded core switch peer.

The station announcements mechanism differs a little in the core switch system from the simpler environment illustrated in FIG. 2. In order to provide its function, the system of FIG. 3 is configured with distinct sets of VLANs on its Access and Core side. In practice, this means that a core network switch should not participate in Access Network Spanning Tree activity and access network switches should not participate in Core Network Spanning Tree activity. As explained above, a spanning tree methodology is incapable to manage the potentially redundant paths offered by the members of a peer switch group. Therefore, the members of the switch peer group manage the redundancy themselves. Station announcements provides a means for switch peers to communicate to non-members of the switch group decisions about which switch is responsible for a VLAN, without requiring any special software or understanding of the switch on the non-member switches.

The above example concerns a peer switch group with two members. However, it shall be appreciated that the invention also extends to peer switch groups of any size.

In the broadest sense this invention may be applied to any OSI layer 2 packet switch, such as those found in data networks. Although the applicability for circuit switches, such as those in traditional voice networks, has not been tested, the invention may be applicable to those circuits as well. Of the various layer 2 protocols in use, the invention works well with Ethernet and to switches implementing Ethernet. However, the concept here, of course, is extendable to other layer 2 protocols such as ATM.

The invention is discussed here in terms of a network partitioned into VLANs. In that scenario each switch in the peer group takes responsibility for a specific subset of the VLANs that traverse the peer group. The invention may abide by the 802.1Q IEEE standard for VLAN and message priority tagging. Of course, the invention is not so limited and may be applied to any network.

Although the invention has been discussed with respect to specific examples, the invention shall not be so limited and it shall be appreciated that modification and variations of the invention may be practiced within the spirit and scope of the disclosed invention.

The invention claimed is:

1. A method for message handling in a local area network having redundant paths, comprising:
   providing a peer group having a first peer switch and a second peer switch such that the first and second peer switches provide redundant paths in the network, the second peer switch having a plurality of clients, wherein the plurality of clients comprise all end stations reachable by the second peer switch;
   providing a third switch;
   sending a station message announcement by the first peer switch for each of the plurality of clients of the second peer switch, wherein the station message announcement is sent by the first peer switch out of every one of its ports other than the one through which a respective client communicates;
   the first peer switch inserting in each station message announcement a source address of the respective client; and
   receiving the station message announcement by the third switch, the third switch configured to treat the station message announcement as though the station message announcement came from the respective client identified in the source address.

2. The method according claim 1 wherein the source address is comprised of an Ethernet MAC address.

3. The method according claim 1 further comprising maintaining a forwarding table that pairs hardware stations and ports to which a switch should forward a received frame.

4. The method according claim 3 further comprising transferring a load from the second peer switch to the first peer switch, the second peer switch having the plurality of clients and the load comprised of a subset of the plurality of clients; and
   wherein the sending a station message announcement is sent for the subset of the plurality of clients.

5. The method according claim 3 further comprising detecting that the second switch failed.

6. The method according claim 1 further comprising monitoring the second peer switch by the first peer switch to determine if the second peer switch has failed.

7. The method according claim 1 further comprising transferring a load from the second peer switch to the first peer switch, the second peer switch having the plurality of clients, the load comprising of a subset of the plurality of clients; wherein the sending a station message announcement is sent for the subset of the plurality of clients.

8. The method according claim 1 further comprising detecting that the second peer switch failed, the second peer switch having the plurality of clients, wherein the sending a station message announcement sends a station message announcement for each of the plurality of clients of the failed second peer switch.

9. A method for message handling in a communications network having redundant paths, comprising:
   providing a peer group having a first peer switch and a second peer switch such that the first and second peer switches provide redundant paths in the network, the second peer switch having a plurality of clients, wherein the plurality of clients comprise all end stations reachable by the second peer switch;
   providing a third switch not in the peer group;
   maintaining a forwarding table of the second peer switch by the first peer switch, the table having a source addresses of the plurality of clients;
   sending a station message announcement by the first peer switch for each of the plurality of clients of the second peer switch, wherein the station message announcement is sent by the first peer switch out of every one of its ports other than the one through which a respective client communicates;
   the first peer switch inserting in the station message announcement the source address of the respective client; and
   receiving the station message announcement by the third switch, the third switch treating the station message announcement as though the station message announcement came from the respective client identified in the source address such that the third switch learns a new path for the respective client that comprises the first peer switch.

10. The method according claim 9, wherein the sending, the inserting, and the receiving are performed for a subset of the plurality of clients of the failed second peer switch.

11. An apparatus for message handling in a local area network including a plurality of switches and a plurality of clients, comprising:
   a first peer switch that monitors the status of a second peer switch, the second peer switch having a plurality of clients, wherein the plurality of clients comprise all end stations reachable by the second peer switch; and
   a redundant path provided by the first and second peer switches via which the plurality of clients are connected through the network,
   wherein the first peer switch is configured to create a station message announcement for each of the plurality of clients of the second peer switch, each station message announcement sent by the first peer switch having a source address of a respective client of the second peer switch,
   wherein each station message announcement is sent by the first peer switch out of every one of its ports other than the one through which the respective client communicates, and
   wherein the station message announcement is configured such that a third switch that receives that station message announcement treats the station message announcement as though the station message announcement came from the respective client such that the third switch learns a new path for the respective client that comprises the first peer switch.

12. The apparatus according to claim 11, wherein the first and second peer switches are OSI layer 2 packet switches.

13. The apparatus according to claims 11 wherein the network is a virtual local area network.

14. The apparatus according to claims 11 wherein the network is partitioned into logical networks including a Core Network and an access network.

15. The apparatus according to claim 14 further comprising a wireless server connected to at least one of the first peer switch and the second peer switch.

* * * * *